United States Patent
Hodges et al.

(10) Patent No.: US 8,788,657 B2
(45) Date of Patent: Jul. 22, 2014

(54) COMMUNICATION MONITORING SYSTEM AND METHOD ENABLING DESIGNATING A PEER

(75) Inventors: Daniel Hodges, San Francisco, CA (US); Andrew Weiss, San Ramon, CA (US); Joseph Anakata, Alameda, CA (US)

(73) Assignee: WaveMarket, Inc., Emeryville, CA (US)

( * ) Notice: Subject to any disclaimer, the term of this patent is extended or adjusted under 35 U.S.C. 154(b) by 92 days.

(21) Appl. No.: 13/308,708

(22) Filed: Dec. 1, 2011

(65) Prior Publication Data

US 2012/0151047 A1 Jun. 14, 2012

Related U.S. Application Data

(63) Continuation-in-part of application No. 13/249,996, filed on Sep. 30, 2011.

(60) Provisional application No. 61/421,535, filed on Dec. 9, 2010, provisional application No. 61/421,519, filed on Dec. 9, 2010, provisional application No. 61/421,525, filed on Dec. 9, 2010, provisional application No. 61/421,547, filed on Dec. 9, 2010.

(51) Int. Cl.
*G06F 15/173* (2006.01)

(52) U.S. Cl.
USPC ............................ 709/224; 709/223

(58) Field of Classification Search
USPC ......................... 709/221, 223, 224
See application file for complete search history.

(56) References Cited

U.S. PATENT DOCUMENTS

| | | | |
|---|---|---|---|
| 7,849,502 B1 | 12/2010 | Bloch et al. | |
| 7,899,704 B1 | 3/2011 | Thompson | |
| 7,996,005 B2 | 8/2011 | Lotter et al. | |
| 8,185,953 B2 | 5/2012 | Rothstein et al. | |
| 2002/0049806 A1 | 4/2002 | Gatz et al. | |
| 2003/0126267 A1 | 7/2003 | Gutta et al. | |
| 2004/0111479 A1 | 6/2004 | Borden et al. | |
| 2007/0277224 A1 | 11/2007 | Osborn et al. | |
| 2008/0005325 A1 | 1/2008 | Wynn et al. | |
| 2008/0066020 A1 | 3/2008 | Boss et al. | |
| 2009/0327150 A1 | 12/2009 | Flake et al. | |
| 2010/0042684 A1 | 2/2010 | Broms et al. | |
| 2010/0077444 A1* | 3/2010 | Forristal | 726/1 |
| 2010/0211694 A1 | 8/2010 | Razmov et al. | |
| 2011/0125844 A1* | 5/2011 | Collier et al. | 709/204 |
| 2011/0289161 A1* | 11/2011 | Rankin et al. | 709/206 |
| 2012/0151045 A1 | 6/2012 | Anakata et al. | |

(Continued)

OTHER PUBLICATIONS

Office Action dated Jul. 12, 2013 for U.S. Appl. No. 13/249,996.

(Continued)

*Primary Examiner* — Wing F Chan
*Assistant Examiner* — Andrew Woo
(74) *Attorney, Agent, or Firm* — Dovas Law, P.C.

(57) ABSTRACT

A computer-implemented subject monitoring method is provided. The method includes providing an online-monitoring agent configured for monitoring a personal computing device, receiving identifying information associated with at least one of an account, email address, site, and service from the personal computing device via the online-monitoring agent, and monitoring via a network the at least one of the account, email address, site, and service based on the identifying information received via the online-monitoring agent.

38 Claims, 8 Drawing Sheets

(56) References Cited

U.S. PATENT DOCUMENTS

| | | |
|---|---|---|
| 2012/0151046 A1 | 6/2012 | Weiss et al. |
| 2012/0151047 A1 | 6/2012 | Hodges et al. |
| 2012/0180135 A1 | 7/2012 | Hodges et al. |

OTHER PUBLICATIONS

Office Action dated Sep. 11, 2013 for U.S. Appl. No. 13/316,360.
Office Action dated Mar. 12, 2013 for U.S. Appl. No. 13/308,697.
Office Action dated Sep. 27, 2013 for U.S. Appl. No. 13/308,697.

* cited by examiner

COMMUNICATION MONITORING SYSTEM AND METHOD ENABLING DESIGNATING A PEER

CROSS REFERENCE TO RELATED APPLICATION(S)

This application is a continuation-in-part of U.S. application Ser. No. 13/249,996, filed Sep. 30, 2011, which claims the benefit of U.S. Provisional Application No. 61/421,535, filed Dec. 9, 2010. This application further claims the benefit of U.S. Provisional Application No. 61/421,519, filed Dec. 9, 2010, Provisional Application No. 61/421,525, filed Dec. 9, 2010, and Provisional Application No. 61/421,547, filed Dec. 9, 2010. Application Ser. Nos. 13/249,996, 61/421,535, 61/421,519, 61/421,525, and 61/421,547 are incorporated by reference as if fully set forth.

BACKGROUND

This invention generally relates to computer network systems, and more particularly, to monitoring and detecting online accounts and online activities of minors by their parents and guardians.

Software solutions to help parents monitor their children's online accounts, participation in social networks, and other online activity can be categorized into two groups: native solutions and cloud-based solutions. Native solutions generally rely on software agents that are downloaded and installed locally on a computer, router, or other local node through which Internet traffic passes, the Internet traffic is monitored as it passes through. Native solutions can monitor this traffic for photos, text, friend requests, visited sites, and any other online activity that parents would be curious about. Cloud-based solutions are not installed locally, but rather monitor a child's activity by accessing the contents of the child's account and activity stream via network-based communication with the relevant sites and services, for example making use of the fact that many online sites expose application programming interfaces ("APIs") to developers for this very purpose.

There are strengths and weaknesses to each approach. The native solution is very proficient at capturing all traffic that passes through it. However, the native solution is blind to traffic and activity that occurs elsewhere on the Internet. This is especially noticeable as children increasingly have access to the Internet from phones, computers at school, friends' houses, and other non-traditional access points that a parent might not be able to access for the purpose of installing software. In contrast, a cloud-based approach can work consistently no matter where a child is accessing the Internet from. However, a major weakness of cloud-based solutions is that their initial setup usually requires the parent to initially identify the child on any social networking accounts of interest. Services exist which discover a child's accounts based on an identifier like an email address, but these services are imperfect and still require the parent to correctly initialize the system with the child's email address. Furthermore, once an online account is identified, cloud-based solutions often need some form of cooperation from the child such as either their login credentials or permission to access their account via a social networking site's platform. Permission is necessary to access the contents of the child's account and the full extent of his or her online activity.

What is needed is a method for monitoring minors' online activities in a more efficient and less cumbersome manner.

SUMMARY

An embodiment according to the within invention comprises a computer implemented method that comprises providing an online-monitoring agent configured for local monitoring of a personal computing device, receiving identifying information associated with at least one of an account, email address, site, and service from the personal computing device via the online-monitoring agent, and monitoring via a network the at least one of the account, email address, site, and service based on the identifying information received via the online-monitoring agent.

Another embodiment according to the within invention further comprises that the personal computing device includes at least one of a laptop, personal computer, smart-phone, router or other internet enabled device.

Another embodiment according to the within invention further comprises that the online-monitoring agent includes at least one of native software and cloud-based software.

Another embodiment according to the within invention further comprises that the native software includes at least one of at least one of a key-logger, peer-to-peer processor, remote redirection agent, and hyper text transfer protocol secure down-grader.

Another embodiment according to the within invention further comprises that the cloud-based software includes at least one of a collection server, a poller server, a proxy server and obfuscation-system.

Another embodiment according to the within invention further comprises that the hyper text transfer protocol secure down-grader comprises removing an automatic redirect if a targeted application server executes a HTTP redirect process, accessing the targeted application server website directly such that at least one website page and user information can be intercepted, rewriting the intercepted at least one website page and user information to retain a connection using HTTP.

Another embodiment according to the within invention further comprises that rewriting intercepted website pages and user information further includes at least one of rewriting POST uniform resource locators in a form to be HTTP instead of HTTPS, rewriting link uniform resource locators in pages to be HTTP instead of HTTPS, changing a HTTP BASE HREF to be HTTP instead of HTTPS and rewriting rules to circumvent specific website protections for websites having website specific login procedures.

Another embodiment according to the within invention further comprises that the HTTPS-down-grader further comprises the steps of tracking a uniform resource locator of each element that is down-graded, whether the down-grade occurred via handling redirects or by rewriting website page contents and storing the uniform resource locator into a uniform resource locator list.

Another embodiment according to the within invention further comprises that a proxy is configured for accessing a uniform resource locator list to determine if an outgoing connection to a targeted application server website should use HTTP or HTTPS to meet the security requirements of the targeted site such that when the uniform resource locator list indicates a HTTP level of security, the proxy server will access the targeted application server website via HTTP or when the uniform resource locator list indicates a HTTPS level of security, the proxy server will access the targeted application server website via HTTPS.

Another embodiment according to the within invention further comprises that the HTTPS-down-grader comprises sending intercepted at least one web page and user information from the down-grader to HTTP sessions, to the collection server.

Another embodiment according to the within invention further comprises that the intercepted user information includes at least one of usernames, passwords, e-mail addresses and uniform resource locators.

Another embodiment according to the within invention comprises a computer-implemented monitoring and reporting method. The method includes receiving via a network identifying information associated with one or more of an account, email address, site, and service corresponding to a particular subject. The one or more of an account, email address, site, and service is monitored via a network based on the received identifying information for one or more communications received by or generated by the particular subject. A triggering criterion is detected in the at least one of the account, email address, site, and service, and the detection of the triggering criterion is reported to a user.

Another embodiment according to the within invention comprises a computer activity monitoring and reporting system comprising one or more computing systems including memory comprising instructions operable to enable the one or more computing systems to perform a procedure. The procedure includes receiving via a network identifying information associated with one or more of an account, email address, site, and service corresponding to a particular subject. The one or more of an account, email address, site, and service is monitored via a network based on the received identifying information for one or more communications received by or generated by the particular subject. A triggering criterion is detected in the at least one of the account, email address, site, and service, and the detection of the triggering criterion is reported to a user.

Another embodiment according to the within invention comprises a computer-implemented monitoring and reporting method. The method includes receiving via a network identifying information associated with one or more of an account, email address, site, and service associated with a particular subject. A designation of a peer of the subject is received. Communications between the designated peer and the subject are monitored on the one or more of the account, email address, site, and service associated with the subject, and one or more monitored communications between the designated peer and the subject are reported to a user.

Another embodiment according to the within invention comprises a computer activity monitoring and reporting system comprising one or more computing systems including memory comprising instructions operable to enable the one or more computing systems to perform a procedure. The procedure includes receiving via a network identifying information associated with one or more of an account, email address, site, and service associated with a particular subject. A designation of a peer of the subject is received. Communications between the designated peer and the subject are monitored on the one or more of the account, email address, site, and service associated with the subject, and one or more monitored communications between the designated peer and the subject are reported to a user.

The above and yet other objects and advantages of the within invention will become apparent from the hereinafter set forth Brief Description of the Drawings, Detailed Description of the Invention, and Claims appended herewith.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENTS

Figure 1:
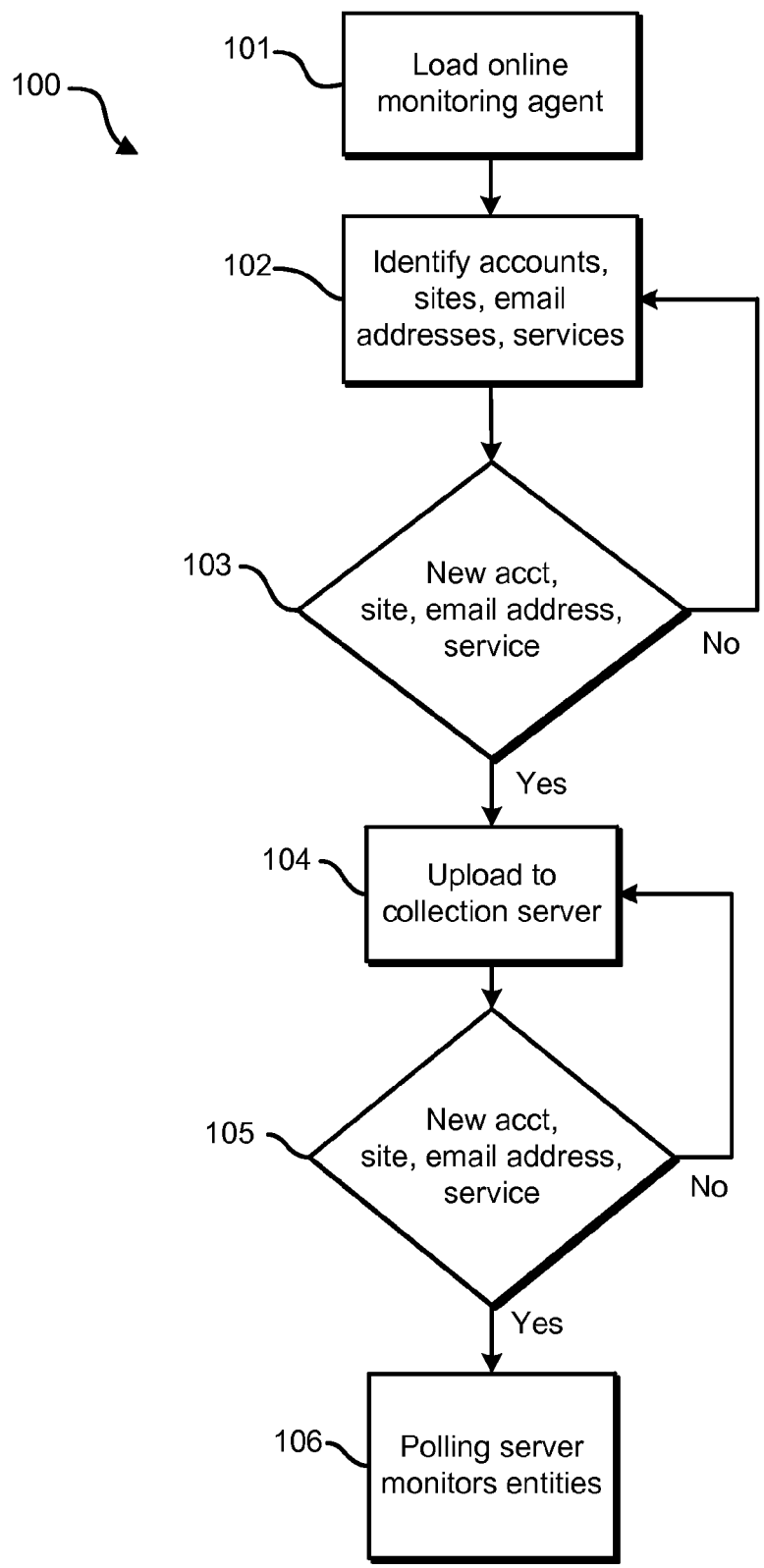
FIG. 1 illustrates a method for monitoring online accounts according to an embodiment of the within invention.

FIG. 1 illustrates a method 100 for monitoring online accounts according to an embodiment of the within invention. A personal computing device such as a laptop, personal computer, smart-phone, router or other internet enabled device is loaded with an online-monitoring agent (step 101). The online-monitoring agent comprises at least one of a keylogger, peer-to-peer processor, remote redirection agent, hyper text transfer protocol secure ("HTTPS") down-grader ("HTTPS-down-grader") also referred to as hyper text transfer protocol ("HTTP") defang and any other process that enables the tracking of data. The online-monitoring agent identifies which accounts, services, email addresses and sites the minor is using (step 102). New identifying information is passed on to a cloud-based computer system, which preferably includes a collection server. The collection server monitors those accounts, sites and services (step 103) in an ongoing manner, no matter where the minor is accessing those accounts, sites and services from. Meanwhile, each time the minor returns to one of the access points having the online-monitoring agent installed, that software continues to look for evidence of previously unknown accounts and email addresses, which can then be fed into the collection server (step 104). A primary purpose of the collection server is to function as a common endpoint for all information collected. The information can include but is not limited to usernames, passwords, alternate e-mail addresses, visited website addresses to determine participation in anonymous forums and information gathered from components of the HTTPS-down-grader regardless of where those components reside, such as on end-user computers, residential gateways or a proxy server. If there is new information saved at the collection server, then that new information is picked up by a poller server (step 105). The poller server periodically requests information about any monitored entities (step 106). Monitoring levels vary depending on what information the collection server has on file for the monitored entities. In its simplest form the poller server polls publically available information on accounts such as on microblogging accounts that use 140 characters or less. More advanced functionality uses a username and password to log into a social networking site to determine newly added friends, check who the minor is corresponding with via private messages and other items of interest that are only accessible while logged in. The frequency of requests for different types of information may be tailored to meet a parent's or guardian's requirements. For example, since microblogging accounts that use 140 characters or less have account entries that are usually publically available, a parent may request querying for updates only once a day. However if the minor is frequently corresponding with newly added friends, monitoring frequency can be increased.

Another embodiment according to the invention comprises using the online-monitoring agent to obtain a minor's login credentials, so that those credentials can be fed back to a cloud-based system to enable direct access to the minor's online content and activity stream, without requiring direct participation or cooperation from the minor.

Another embodiment according to the within invention comprises an obfuscation-system that can generate alternate Internet protocol ("IP") addresses. The obfuscation-system can be used when a targeted application server has filters to prevent large numbers of connections for different users from a single IP address. The obfuscation-system will allow a system's hosted servers such as the collection server and poller server to originate connections to the targeted application server using the IP address of the minor's personal computing device. The obfuscation-system can handle connections for that specific minor or any number of other minors whose IP addresses are in a nearby network IP address block that is close to the minor's IP address.

Another embodiment according to the within invention comprises installing a HTTPS-down-grader in a proxy or on a residential gateway. The HTTPS-down-grader can function as a standard HTTP proxy configured by a user or the HTTPS-down-grader can function as a transparent proxy by intercepting traffic as it flows to a target site. A function of the HTTPS-down-grader is to process HTTPS connections to be down-graded to HTTP such that traffic can be monitored for usernames, passwords and other information such as web mail service, email addresses, and other user information that can be useful to have for monitoring the minor. Connections leaving the proxy destined for a targeted application server would still be encrypted via HTTPS if the original connection that was HTTPS-down-graded, was intended to be secure.

Figure 2:
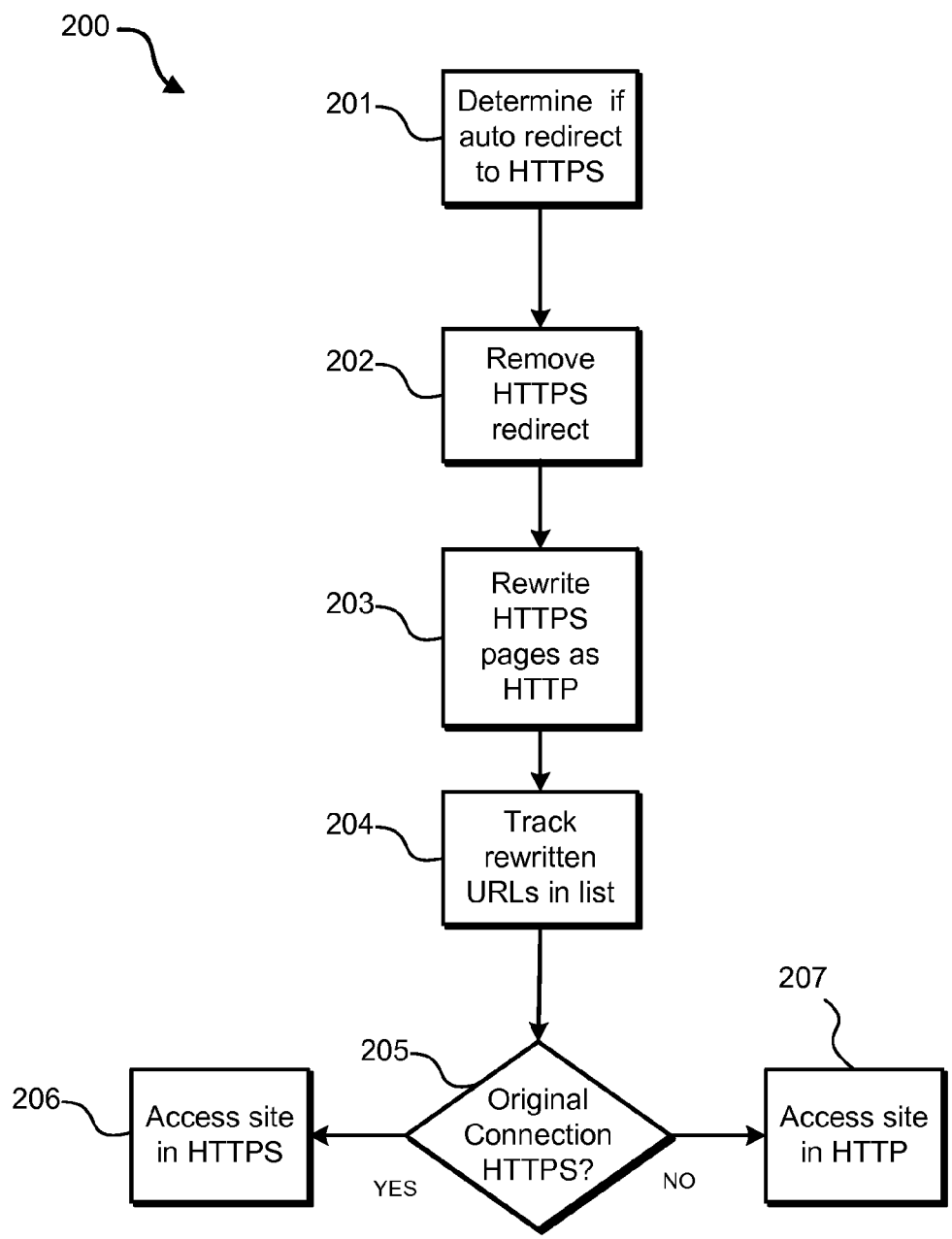
FIG. 2 illustrates a method for a HTTPS-down-grader according to an embodiment of the within invention.

FIG. 2 illustrates a method 200 for a HTTPS-down-grader according to an embodiment of the within invention. If a targeted application server website does an automatic HTTP redirect process (step 201), for example HTTP response status code 301 ("HTTP 301"), HTTP 302, HTTP 303 and HTTP 307, that upgrades a HTTP request to HTTPS, then the automatic redirect is removed (step 202) and the targeted application server website is contacted directly so that the website page and user information can be intercepted. This would happen when a minor typed a bare domain name in an address bar of a browser but the targeted application server website uses HTTPS for all traffic. All intercepted website pages and user information will be rewritten to retain a connection using HTTP instead of HTTPS (step 203). This applies whether the page being viewed was itself down-graded to HTTP such as in the case of a website having all content in HTTP but login/authentication is handled by a HTTPS based POST, or when the page itself was originally HTTP. Examples of rewriting include but are not limited to rewriting POST uniform resource locators ("URLs") in forms to be HTTP instead of HTTPS, to rewriting link URLs in pages to be HTTP instead of HTTPS, and changing a HTTP BASE HREF to be HTTP instead of HTTPS. Additionally, for sites with complicated login procedures or which fail to work with standardized procedures, website page specific rewriting rules can be added to circumvent those websites' protections as necessary. The HTTPS-down-grader will keep track of the URL of each element that is down-graded (step 204) in a list, whether via handling redirects or by rewriting website page contents. When a proxy makes an outgoing connection, it will use the URL list to determine if the outgoing connection to the target site should use HTTP or HTTPS to meet the security requirements of the targeted site (step 205). It will access the targeted application server website via HTTP when the URL list indicates a HTTP level of security (step 206) or it will access the targeted application server website via HTTPS when the URL list indicates a HTTPS level of security (step 207). Additionally the HTTPS-down-grader will send specified user information intercepted such as usernames, passwords, e-mail addresses and URLs, from the down-graded to HTTP sessions to the collection server.

Figure 3:
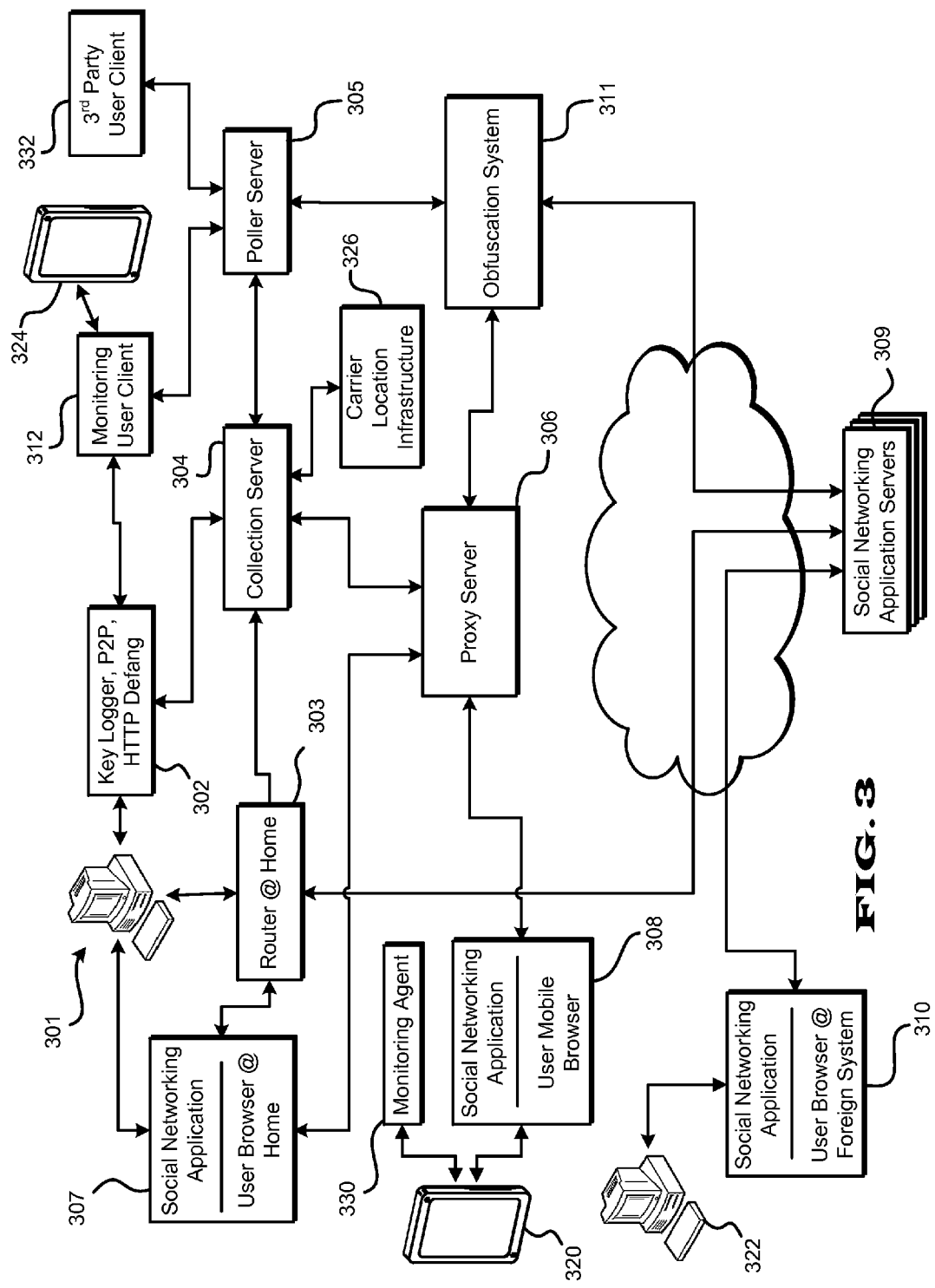
FIG. 3 illustrates a system for monitoring a minor's online activities according to an embodiment of the within invention.

FIG. 3 illustrates a system for monitoring a minor's online activities according to an embodiment of the within invention. A personal computing device 301 such as a personal computer, laptop, tablet, smart-phone or any other Internet accessible device is loaded with an online-monitoring agent 302 such as a key-logger, peer-to-peer processor, HTTPS-down-grader or any other software that can capture electronic user information. The online-monitoring agent 302 can alternatively be loaded onto a router 303 or other residential gateway. The personal computing device 301 can correspond for example to a computing device in the minor's home connected to the router 303. A mobile monitoring agent 330 for capturing user information can be loaded on a smart phone 320 or other mobile device used by the minor.

The online-monitoring agent 302 or 303 collects and sends data to a collection server 304. The collection server 304 functions as a repository for a minor's electronic information such as usernames, device identifiers, email addresses and passwords. The collection server 304 is periodically polled for new and updated information by a poller server 305. A proxy server 306 including an HTTPS-down-grader interacts with browser access from a home browser 307, enabled for example by the personal computing device 301, or a mobile-browser 308, enabled for example by the smart-phone 320 operated by the minor targeted to a particular application server 309, to render accessible the minor's electronic user information to the collection server 304. The minor's user information can be collected for example during the minor's browser interactions with a social networking application (e.g. Twitter™, Facebook™) via a particular social networking application server 309. Alternatively for example, the minor's user information can be collected during interactions with a third party application (e.g. TweetDeck™, Plume™) which provides an alternate interface to the social networking application for example through an alternate application server configured for communication with the particular social networking application server 309.

The poller server 305 accesses information regarding a monitored minor from the social networking application servers 309, for example using user names, passwords or other user information provided by the collection server 304. The poller server 305 is configured to access information related to or inputted by a monitored minor on an application server 309 regardless of whether the information originates from the personal computing device 301, the home browser 307 executed on the device 301, the user mobile browser 308, or a foreign browser 310. The foreign browser 310, enabled for example by a foreign personal computing device 322, is a browser on an unrecognized system which can include for example a browser accessed by the minor residing on the minor's friend's computer, a public computer or other unrecognized system. The poller server 305 can access a minor's information on an application server 309 for example through connection to a publically accessible web interface, by logging on to the minor's social networking application account, or via an API exposed for the purpose of user monitoring. Alternatively, the online monitoring agent 302 or 303 can perform the functions of the poller server 305, connecting to the social networking application servers 309.

The poller server 305, or alternatively the online monitoring agent 302 or 303, provides status updates to monitoring users such as parents of a monitored minor at predetermined intervals or responsive to predetermined events. A monitoring user client 312, implemented for example on a suitable personal computing device 324, can interface with the poller server 305 and/or the online monitoring agent 302 or 303 to receive status updates regarding the minor's online activities. The status updates can include for example descriptions of postings by the minor or the minor's friends on particular social networking sites, indications of whether particular social networking sites are accessed by a device known by the poller server 305 and/or the online monitoring agent 302 or 303, and the times of such accesses. A status update can include an indication of an IP address from which a posting originated, or alternatively a geographic location from which a posting originated if the device from which the posting originated is location-enabled, for example a GPS-enabled smart phone.

If information extracted by the poller server 305 or the online monitoring agent 302 or 303 from a social networking application server 309 is determined not to correspond to activity of recognized systems recorded by the online monitoring agent 302 or 303 or the collection server 304, the status provided to the monitoring user client 312 can include an indication that a posting originated from an unknown device (i.e. foreign system). Alternatively, such status can be provided responsive to a determination that extracted information includes information corresponding to a system not recognized as associated with the monitored minor. The online monitoring agent 302 or 303 and/or the poller server 305 preferably maintain a listing of known devices corresponding to the minor for making such determination. The status provided to the monitoring user client 312 can include for example a statement such as "your child appears to be accessing Facebook™ from a device other than your home PC or his mobile phone" or "your child accessed Twitter™ from an unknown system at 4:00 pm".

If it is determined that the posting originated from an unknown device, for example the foreign personal computing device 322, the collection server 304 can query the location of a location-enabled mobile device known to be associated with the monitored minor, for example the smart phone 320. The collection server 304 can query the location of the location-enabled mobile device 320 directly or via a request to a telecommunication carrier location infrastructure 326. The collection server 304, or alternatively the online monitoring agent 302 or 303, provides a status to the monitoring user client 312 indicating that a particular social networking application was accessed by an unknown system at a particular time at a particular location. The status provided to the monitoring user client 312 can include for example a statement such as "your child accessed Twitter™ from an unknown system at 4:00 pm at or near 924 Spruce Street", or "your child accessed Facebook™ from an unknown system at 12:30 pm at or near Northern Public Library."

Some application servers have filters to prevent large numbers of connections for different users from a single IP address. An obfuscation-system 311 allows a system's hosted servers such as the collection server 304 and poller server 305 to originate connections to the targeted application server using the IP address of the minor's personal computing device. The obfuscation-system 311 can handle connections for that specific minor or any number of other minors whose IP addresses are in a nearby network IP address block that is associated with the minor's IP address. When necessary the obfuscation-system 311 can generate alternate IP addresses using a peer to peer process or any other system process suitable for generating IP addresses.

The collection server 304, poller server 305, proxy server 306 and obfuscation system 311 can be embodied by one or a plurality of physical systems and enabled by hardware, software or combinations thereof. The social networking application servers 309 can be executed on or enabled by any suitable number of systems or devices.

Parents and guardians are interested in their children's communication patterns. Changes in these patterns can reflect changing relationships, social circles, new influences in their children's lives, losing friends, and isolation. Systems described in FIG. 3 can enable the monitoring of such communication patterns. Herein the word child can indicate any subject, child or adult, for which monitoring is desired. Herein the words "communication" and "interaction" can indicate any one-way communication (e.g. email, SMS, social network posting) or two-way communication (e.g. telephone, IM chat window) between two or more entities. Herein the word "peer" of a particular subject can indicate a person which has currently or in the past used a particular network accessible site or service (e.g. social networking application, IM service, email service) used by the subject, communicated with the subject (e.g. via email, IM message, or SMS message), or whose contact information is stored on a device or system operated by the subject.

Social networking via a social networking application is a form of communication which may include writing on walls, private messaging, and exchanging comments in public or private web interfaces. Communication can be inferred from being tagged in the same photos, tagged in photos from the same event, tagged or checked in at the same place or event, or being members of the same groups. Monitoring a child's communication can be accomplished by one or more of: installing monitoring software on the computer, mobile device, phone, or router used by such child, for example enabling online-monitoring agents 302 or 303 or monitoring agent 330; accessing the contents of a child's social networking application account via an API enabled for such purpose, for example using the poller server 305; scraping (i.e. web scraping) a child's social networking application account without using an API, with or without the child's login credentials, for example using the poller server 305; accessing contents of a child's account by way an account of one or more of his or her peers which have an access permission to the child's account data (e.g. a peer "friended" with the child in a particular social network), for example by way of the child's parent's account with access to information on the peer's account by way of gaining an access permission (e.g. "friending") to such peer's account. For example the poller server 305 using the login credentials for the parent's account can scrape data related to such friended peer via the parent's account or using an application-enabled API. The above steps for monitoring a child's communication can be performed individually or in suitable combination.

Chats between users on a network via a messaging application are another form of communication. Chats can be monitored by one or more of: installing monitoring software on the computer, phone, or router, for example enabling online-monitoring agents 302 or 303 or monitoring agent 330; scraping a child's account without an API, with or without the child's login credentials, for example using the poller server 305; accessing the contents of a child's account with an API, for example using the poller server 305; accessing the contents of a child's account by way of one of his or her peers, for example by way of the child's parent's account with access to information on the peer's account by linking to or "friending" such peer. The above steps for monitoring chats can be performed individually or in suitable combination.

Email is another form of communication. Email can be monitored by one or more of: installing monitoring software on the computer, phone, or router, for example enabling online-monitoring agents 302 or 303 or monitoring agent 330; scraping a child's account without an API with the child's login credentials for the corresponding email hosting system, for example using the poller server 305; accessing the contents of a child's account with an API, such as an API enabled by the corresponding email hosting system, for example using the poller server 305. The above steps for monitoring email can be performed individually or in suitable combination.

Communication can also be in the form of telephone calls and text messages. Monitoring telephone calls and text messages can be accomplished by accessing communication patterns in a source such as a carrier bill or other carrier records accessed for example via the customer's online account on the carrier's website using the poller server 305. Network accessible call and message records can be accessed via scraping a web interface or implementing an API enabled for such purpose by the carrier, for example using the poller server 305. This is preferably accomplished by comparing historical communication, including total time and/or frequency, with current communications to determine change in usage. For example, a determination can be made of increased communications with a particular peer, wherein such peer is flagged and reported to the parent or other monitoring user. Frequency or amount of communications with a particular peer can be normalized with total communications, so if a child communicates less often with all peers in a particular week, due to being busy with a school project for example, a flag is not triggered for communicating less with the particular peer. Total communication frequency and amount is preferably monitored. Decreased detected total communication can correspond to a determination that a child is withdrawing, for example resulting from depression. Increased detected total communication can correspond to a determination that a child is going hyper active, for example resulting from an addiction or newfound interest in being online.

In regards to the analysis of text, the messages themselves can be analyzed for sentiment (e.g. anger/hostility, depression, sadness), as well as topics (e.g. sex or drug activity). A database of trigger terms and phrases is preferably maintained with which to compare the text, wherein for matching a detected term or phrase with a trigger term or phrase can trigger notification to a parent or other monitoring user. For example the term "hopeless" and the phrase "want to die" can be triggers for determining depression of a monitored child. The terms "sex" and "drugs" can be triggers for determining high risk social activity of a monitored child. Machine learning techniques, such as support vector machine ("SVM"), can also be employed to train a classifier for a targeted sentiment or topic, and then to apply the classifier to the messages themselves to detect if the sentiment or topic is present in the text.

Communication can also be in the form of images. Images may originate from, be received by, or be re-transmitted from a child's phone or other device. Images can be analyzed for inappropriate content, such as nudity, sexual suggestiveness/sex, or alcohol/drug behavior. A database of trigger image profiles is preferably maintained with which to compare transmitted images, wherein for matching a detected image with an image profile can trigger notification to a parent or other monitoring user. Detected images can further be matched with colors, luminosities, shapes or patterns. Machine learning techniques can also be employed to detect constructs such as flesh tones, shapes, or body positions which may be indicative of inappropriate content, for example based on a classifier. Further, text that is associated with an image can be analyzed, and used to corroborate the content of the image.

Figure 4:
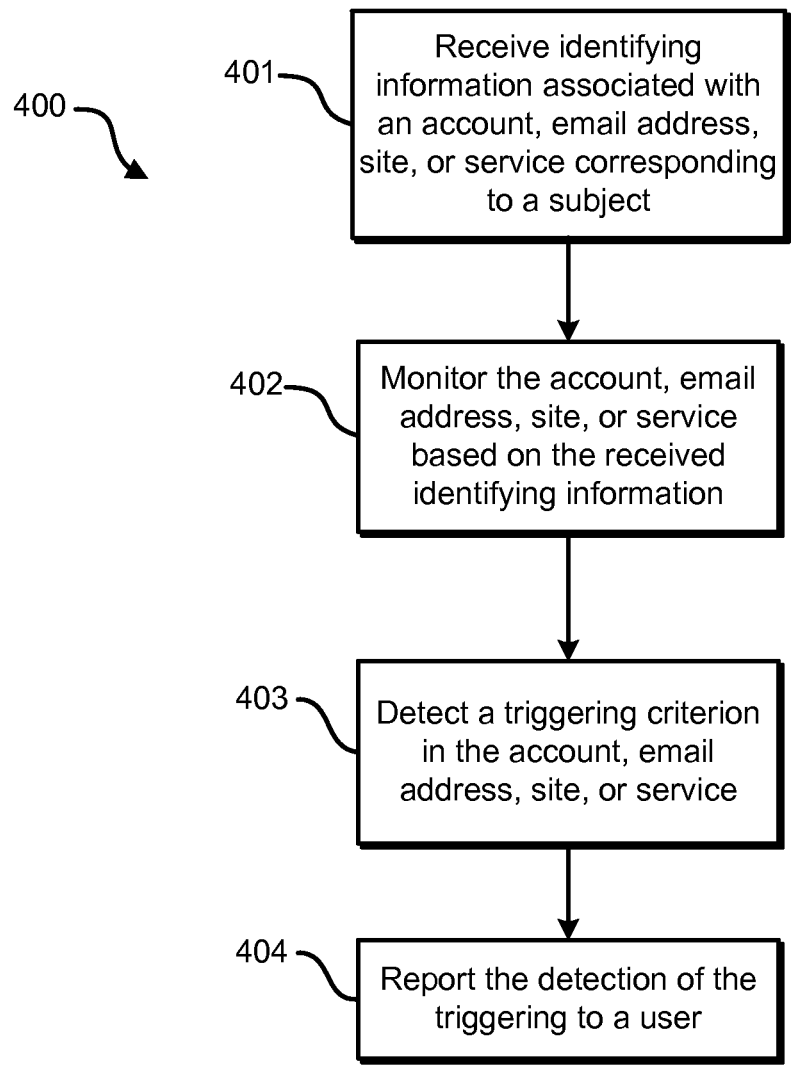
FIG. 4 illustrates a monitoring method useful for reporting changes in communication patterns according to an embodiment of the within invention.

Referring to FIG. 4, a flow chart illustrating a computer-implemented monitoring method 400 useful for reporting changes in a subject's communication patterns according to the within invention is shown. In the method 400, identifying information associated with at least one of an account, email address, site, and service corresponding to a particular subject is received via a network (step 401). The at least one of the account, email address, site, and service is monitored via a network based on the received identifying information for at least one communication received by or generated by the particular subject (step 402). A triggering criterion is detected in the at least one of the account, email address, site, and service (step 403). The detection of the triggering criterion is reported to a user (step 404).

Cyber bullying is a growing problem which be addressed by systems described in FIG. 3. Even when parents become aware of cyber bullying, they often do not know what to do or whom to approach. A parent may approach administration of a school attended by their cyber-bullied child, but the school often wants documented proof of the alleged cyber bullying, not just the parent's verbal complaints after the fact.

According to an embodiment of the within invention, a web-based tool enabled by a network accessible computer system, for example the poller server 305, is provided that gives parents information, for example via a browser on their personal computing device 324, regarding what steps to take (e.g. what questions to ask their children, as well as information on whom to contact) when they learn of possible cyber bullying. This advice can be tailored to the age and relationship of the child or other subject user involved, either as provided by the parent or as automatically determined by the system's connection to a social network such as Facebook™, for example via a social networking application server 309. Furthermore, with regard to the nature and severity of the bullying, severity can be determined based on human review, for example by the parent or guardian of the monitored child or based on the system itself having evaluated the bullying (e.g. the bullying took place on the child's Facebook™ wall and the system has access to the Facebook™ wall via a connection through an API enabled by a Facebook application server).

The system, for example via the poller server 305 or the monitoring agents 302, 303 and 330, is configured to retrieve communications and other relating to a particular subject. The system is enabled to gather information via various protocols to determine potential bullying activity, for example text messages (e.g. SMS), email, social network application, and telephone communications. A prevalent form of bullying is through telephone communications, as this may be considered by a bully to be an unverifiable communication. The system, for example via the monitoring agent 330, is configured to initiate recording of the subject's phone or video conversation on the subject's mobile device, for example the mobile device 320, record the phone number of the caller, and time stamp the recorded conversation.

Communications including text, voice or images can be analyzed for sentiment corresponding to bullying (e.g. anger/hostility, depression, sadness). A database of trigger terms and phrases corresponding to bullying, or a machine learning classifier, such as SVM, is preferably maintained with which to compare/analyze the text. Matching a detected term or phrase with a trigger term or phrase, or determining based on the classifier a classifier score exceeding a predetermined threshold, can trigger notification to a parent or other monitoring user of suspected bullying, for example via a monitoring user client 312. For example the term "kill" and the phrase "you're dead" can be triggers for determining potential bullying. Analyzing sentiment preferably further includes determining topics of the communications and severity of the bullying activity including determining whether such bullying is verbal or physical. Different terms or phrases or classifier models preferably correspond to differing levels of severity of bullying activity.

In making a determination of bullying activity in communications from a particular subject to another subject, the frequency of trigger terms and phrases in the communications and/or classifier scores of the communication content are preferably considered. A threshold number or duration of communications including trigger terms or phrases or a threshold number or duration of communications corresponding to threshold-exceeding classifier scores can be required to result in a determination of bullying activity. For example, it can be required that communications including a trigger term or phrase or corresponding to a sufficient classifier score from a first child to a second child be transmitted a threshold number of days during a particular time frame (e.g. three days within a two week period) to meet a triggering criterion resulting in transmission of a notification concerning the communications to a parent or other monitoring entity.

If a set or subset of communications (e.g. text messages, IMs, emails) received by a particular subject is determined to include potentially bullying or aggressive content, the system determines that the subject may be the target of bullying behavior. If a set or subset of communications sent by a subject is determined to include potentially bullying or aggressive content, the system determines that the subject may be the originator of bullying behavior. If the subject is the originator of such communication, the system can intercept the communication and prevent delivery or provide a warning to the subject, for example via the monitoring agent 302, 303, or 330 or the proxy server 306 and the subject's personal computing device 301 or mobile device 320, Such warning can include for example the following text: "If you send that message, I'm going to tell you parents", or "do you really want to send that message, it appears to contain aggressive content." Responsive to such warning a subject must preferably actively confirm or cancel sending the potentially objectionable communication. Alternatively, a time-out can be imposed on any device-generated content that is determined to be objectionable, preventing transmission of the communication or associated content.

In addition to determining potential bullying activity between two or more subjects, relationships of the subjects involved in the bullying activity are preferably determined. Determinations of relationships preferably include 1) Determining if subjects for which bullying activity is determined have access permission to the other's account data. (e.g. Are the bullying child and bullied child "friended" with each other in one or more social networking applications?) 2) Determining how many parties mutually have access permission to the account data of the two or more subjects involved in the bullying activity. (e.g. How many mutual "friends" in one or more social networking applications do the bullying child and the bullied child have?) 3) Determining how frequently the subjects involved in the bullying activity communicate. 4) Determining topics of detected communications of the subjects involved in the bullying activity. 5) Determining a potential severity of the bullying activity based for example on one or more of the frequency of detected communications, the language or analyzed sentiment, and the determined topics of the detected communications. 6) Generating a time activity history of the bullying activity including one or more of a history of the severity, a history of the determined topics, a history of the language or analyzed sentiment which can include content of the communications or excerpts thereof evidencing the bullying, including for example text, image, video, or recorded telephone calls or video calls.

In cases where the system is able to witness some or all of the bullying and some or all of the history of interactions between some or all of the parties involved, the system preferably compiles a report (e.g. a "Bully Report") for transmission to a monitoring user client which can be utilized as an evidentiary record which can be provided to other parties such as other parents or school administrations. Such report preferably provides a background and detailed history of the interactions (e.g. How long have the children or subject users been friends? How many mutual friends do they have? How frequently do they normally communicate and about what?), thereby highlighting the evolution of the bullying and providing context including dates and times.

The system, for example via the poller server 305, preferably generates a report based on any identified bully, set of bullies, or bullying incident without the aggrieved party having to sift through documentation manually. The system preferably also allows for interaction through means such as: mobile web, a mobile application, email, and even voice or text, for example via a monitoring user's personal computing device 324. The system preferably provides helpful steps for the parent and child to implement to prevent the bullying in the short term, such as instructions on how to remove offending material or lock down privacy settings. The report can be emailed, viewed online, downloaded (e.g. as a PDF), or printed. Links to the report could be sent via email, text, or Instant Message.

The system preferably includes a contacts database so it can send pertinent information regarding the alleged cyber bullying to the appropriate parties. School administrators can maintain their entries in such databases, for example via a user client 332, so that their contact information is up to date permitting it to receive information regarding alleged cyber bullying from concerned parties, for example via the poller server 305. Such information can also be maintained by a concerned group, such as a parent community, or crowdsource style. For example, if one parent at a particular school has already determined who to contact about a bullying incident in the past, the ability to send the report to that person can be provided to other parents at the particular school with one click.

Figure 5:
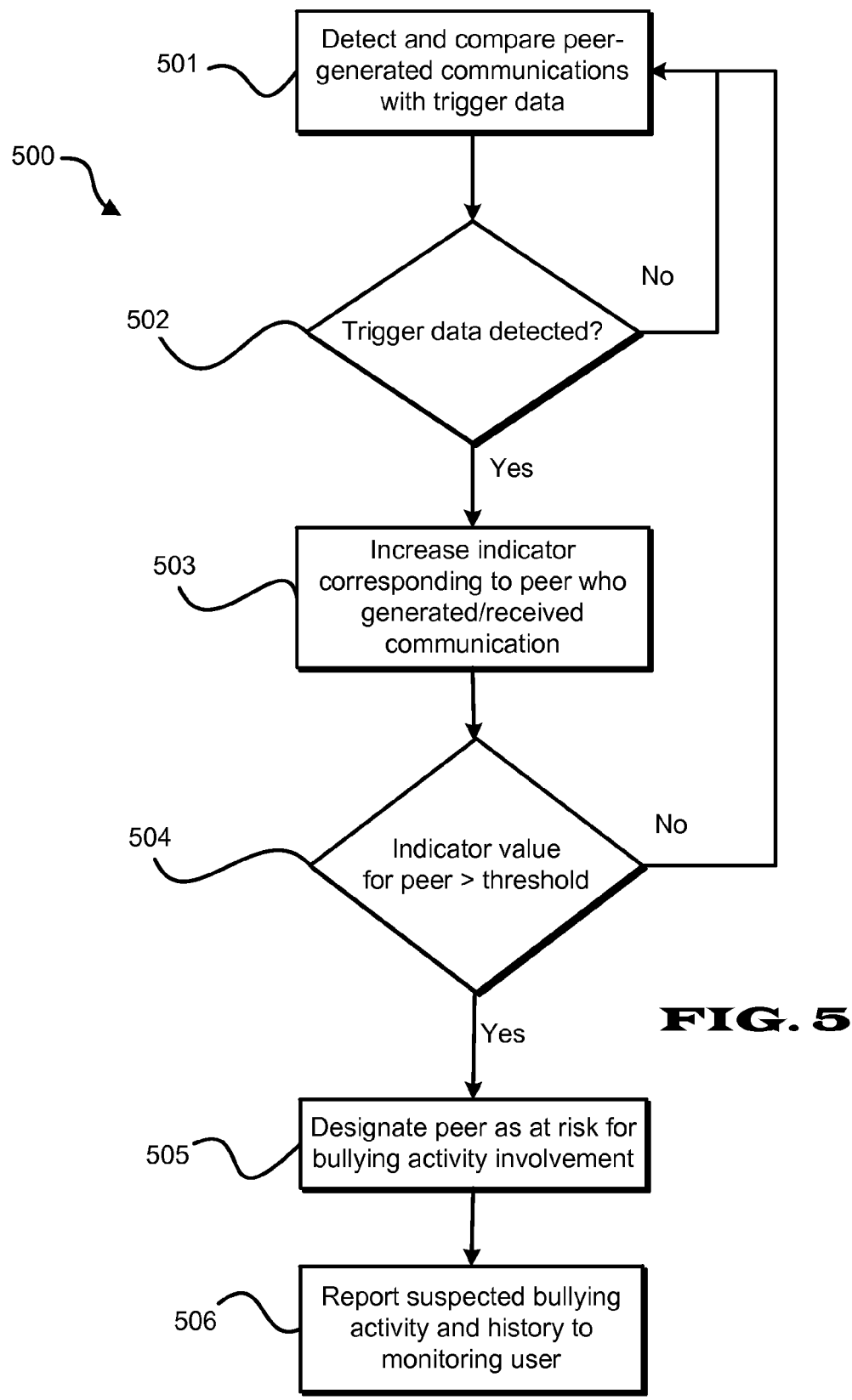
FIG. 5 illustrates a monitoring method useful for reporting suspected bullying according to an embodiment of the within invention.

Referring to FIG. 5 a flow chart illustrating a computer-implemented monitoring and reporting method 500 useful for reporting suspected bullying activity according to the within invention is shown. In the method 500, communications between a particular subject child and his/her peers are detected and compared with trigger data such as terms, phrases, classification models, or images (step 501). If trigger data is detected in the communication by the comparison, an indicator corresponding to the peer who generated or received the communication is increased (step 503). If the indicator corresponding to the peer is determined in step 504 to be greater than a predetermined threshold, the peer is designated to be at risk for involvement in bullying activity with the subject (step 505). Depending on the trigger data detected in the communications, the peer can be designated as a person bullying the subject or being bullied by the subject. More generally, the peer can be designated as a person acting aggressively toward the subject or being acted aggressively upon by the subject. The suspected bullying or aggressive activity and history is reported to a monitoring user (step 506), for example a parent of the subject child.

According to the invention, a monitoring system can be configured notify a parent or other monitoring user of all or most content and interactions from a child's social networking account, for example using a combination of a web or mobile dashboard and email notifications sent to the parent. Under certain circumstances, such a deluge of data may be overwhelming to a parent and in some cases may not provide advantages over more hands-on approaches, such as simply logging into their child's social networking account directly or "friending" their child on a social networking application service so the parent has access to all of the content and interactions taking place.

The monitoring system can be configured to filter and limit the content and interactions passed along to the parent by type, using a combination of defaults and user-adjustable settings. For example, in the context of a social networking application, a parent can be notified of new friendships and photos uploaded by the child, but not new friend requests or photos the child is tagged in. A parent who is overwhelmed with data provided by the system can dial back the categories of notifications and content they want to see, while a parent who wants more content can adjust the settings accordingly.

Parents or other monitoring users may care about content and interactions emanating from certain peers more than others. For example, parents may not trust a certain peer's influence on their child, or may have suspicions of a certain peer bullying or being bullied by their child currently or in the past, or may hear their child mention a name in passing that isn't familiar to the parent. The parent may be disproportionately interested in content and interactions having to do with such peer, and so may not want to filter and limit such content as detected by the monitoring system, but may not necessarily want to wade through the same level of detailed information from all of the child's other peers, friends and interactions.

According to the within invention, a system is provided, for example via the poller server 305, that enables monitoring users such as parents to designate ("flag"), for example via a monitoring user client 312, one or more peers of a subject (e.g. their child) as peers that the monitoring user is particularly interested in and wants the system to watch. The system preferably provides an interface to enable a monitoring user to select a peer from a list of the monitored subject's friends or contacts on a particular social network or contacts stored in a local or network accessible system, or to type or otherwise enter the peer's name, or a combination thereof. For example where the monitoring user starts typing a name using the monitoring user client 312, the system is configured to auto-suggest those of the subject's social networking friends or contacts that match the partial name the monitoring user has typed so far.

While the system is preferably configured to monitor a subject's interactions with a plurality of peers designated or not designated, once a monitoring user has designated a particular peer as one to watch, the system sets a different threshold for what to monitor and/or report for that particular designated peer. For example, the system can report all available data, for example any interactions the subject has with the designated peer, any content posted by the peer on the subject's page, and any accessible content and interactions the peer is having on a particular site in general even if such interactions are not directed to or related to the monitored subject. Whereas peers which are not designated (i.e. "unflagged") can correspond to a higher reporting threshold, for example the system only reports a subject's interactions with unflagged peers which include trigger phrases or terms such as "sex" and "drugs", or which interactions correspond to threshold-exceeding classifier scores. In another implementation, the number of terms which can trigger a report corresponding to an unflagged peer can be much greater than the number of terms which can trigger a report corresponding to a flagged peer. For example, the system can be configured such that the terms "date", "love", "party", "drugs" and "sex" included in a communication to or from a flagged peer trigger a report, whereas only the terms "drugs" and "sex" included in a communication to or from an unflagged peer trigger a report. Similarly, the classifier score that can trigger a report for an unflagged peer can be higher than the classifier score for a flagged peer.

As such, designated peers and non-designated peers are subject to different triggering criterion, wherein monitored communications with a designated peer are reported responsive to detecting a particular triggering criterion, and monitored communications with non-designated peers are reported responsive to detecting another triggering criterion. A triggering criterion for non-designated peers preferably corresponds to a higher threshold than a triggering criterion for designated peers, wherein an interaction meeting the non-designated peer triggering criterion also meets the designated peer triggering criterion, but an interaction meeting the designated peer triggering criterion does not necessarily meet the non-designated peer triggering criterion. The system preferably enables the monitoring users to change or fine-tune the triggering criteria and their reporting preferences regarding flagged (i.e. designated) and unflagged (i.e. non-designated) peers.

The end result is a system where monitoring users get increased notifications and material about selected peers of a subject. The system can be implemented as a remote server accessible via a network, for example the poller server 305, and/or an application executed on a local device operable by the monitoring user and subject, for example the online-monitoring agents 302 or 303 or monitoring agent 330.

A monitoring user such as a parent is enabled to create an account on the online monitoring system, for example via a user interface enabled by the poller server 305. The monitoring user provides login credentials to create an account on the system, for example by providing a username/email and password combination or establishing a connection with an authentication provider such as Facebook Connect™, which credentials are stored by the system. Optionally, the system collects one or more ways to contact the monitoring user, for example email address, phone number, or Facebook™ messaging identifier. The system further collects from the monitoring user information about the monitored subject such as the monitoring user's child to prepare the system to monitor the child. Preferably, the system obtains from the parent, the child, or a monitoring agent, the child's login credentials for a social networking site, obtains from the parent or child permission to access their social networking account through that site's APIs, installs or facilitates installation of monitoring agent software on the child's mobile device(s) such as a smart phone (e.g. monitoring agent 330), installs or facilitates installation of monitoring agent software on the child's laptop or other computing device (e.g. monitoring agents 302, 303), and/or obtains from the parent, child or monitoring agent username and password for other communication services such as email, video chat and/or instant messaging services associated with the child. A benefit of the system is that it is enabled to monitor a subject's communications and activities through a plurality communication channels. The system, for example via the collection server 304 and poller server 305, stores the associations and any necessary credentials for accessing these accounts and activities.

A monitoring user is enabled to flag (i.e. designate) peers of a monitored subject who he or she is especially interested in watching by providing an identifier of such peer. The system is configured to obtain from the monitoring user, for example via an interface enabled by the poller server 305, identifiers for such peers including email addresses, phone numbers, social network handles, IM handles, and/or given names or nicknames of peers of his or her child. The system preferably takes the received identifiers and determines an identity of the designated peer and additional identifiers for example via user discovery services enabled by a particular site or service on which the flagged peer is active, and thereafter monitor communications corresponding to the additional identifiers on accounts, email addresses, sites, and services. The poller server 305 can poll the social networking application servers 309 or other service servers for the additional identifiers. For example, there are social networking services which provide APIs which can be given an email address or phone number and return a name and/or username of a user if the user is on the service. The system can further pull lists of peers from the services which it monitors, for example all of a monitored subject's Facebook™ friends, and/or all of the phone numbers in a phonebook on the subject's mobile device. Such list can be used to determine the identity of a peer for which complete, partial or incomplete identifier given by a monitoring user by comparing the identifier with a pulled peer list. The system can alternatively provide the peer lists themselves to the monitoring user, with an optional sorting and filtering UI, and enable the parent to browse the list of peers and flag the peers to be watched.

The system, for example via the poller server 305 or monitoring agents 302, 303 or 330, processes monitored communications to determine useful information regarding peer interactions to enable flagging by the monitoring user or automatic flagging by the system. The system is enabled to provide the monitoring user a listing of peers corresponding to interactions meeting a triggering criterion, for example via the monitoring user client 312. For example, the system is configured to determine which peer or peers a monitored subject is most commonly communicating with and to provide a list of such peers to the monitoring user to enable flagging, or alternatively, automatically flag such peers. The system is further configured to determine and provide a list of or automatically flag which peers a monitored subject is communicating with during certain time ranges, for example late at night or during school hours, which time range can be selected by the monitoring user. The system can further provide a list of or automatically flag the newest addition or additions to a monitored subject's contacts, for example a child's newest Facebook™ friends or newest entries in their mobile device's phonebook or other contact listing. The system is further enabled to provide a monitoring user a listing of peers that are communicating with a subject (e.g. their child) but do not appear in the subject's stored peers as a contact, for example an incoming message from a non-friend on Facebook™, or a phone number from a device which has phoned the subject but which is not in the subject's phonebook, or an Instant Messaging ("IM") username of a user that has attempted to initiate contact with the subject but does not appear in the subject's IM address book. Accordingly, the system is configured to distinguish and provide details of communications between the monitored subject and peers which are not listed as contacts of the monitored subject. The listing of peers can be provided along with content of the interactions (e.g. emails, SMSs, and IMs, or excerpts thereof) on which the detected triggering criterion is based and with links (e.g. HTML hyperlinks) to enable selective flagging of the peers by the monitoring user.

Whether by entering specific information about a peer, or by browsing the total list of a monitored subject's peers, or by reviewing subsets of peers, for example corresponding to different social networking accounts, the monitoring user selects one or more peers as "flagged". In another example, the system provides a parent a listing of peers discovered via the monitoring agent 330 on their child's mobile device 320, and using the monitoring user client 312, the parent flags a peer from the listing and the system associates by name the flagged peer with a particular Facebook™ friend identified via the poller server 305. Flagging corresponds to an indication that the monitoring user wants to receive additional information about a particular peer and subsequent interactions that that peer has with a monitored subject (e.g. monitoring user's child).

The system stores all known identifiers of the flagged peer and monitors the monitored subject's interactions including communications between the subject and the flagged peer, for example via an API by an application provider, by scraping a web interface, via a native client installed on a user device, or by intercepting traffic from or to a device associated with the subject. Searching and maintaining the identity of a flagged peer enables monitoring the peer across multiple channels. For example, a parent may flag one of her child's Facebook™ friends. From a Facebook™ API and/or scraping the Facebook website, the system may obtain the peer's email address, IM handle, or phone number. The system is then enabled to monitor for communications between the flagged peer and the child via email, IM, phone calling or text messaging, not just on Facebook™. The system enables retrieving via an account, email address, site, or service an identifier of a subject's peer to provide a list to the monitoring user for flagging, and allowing the system to monitor communication between the flagged peer and the subject on other accounts, email addresses, sites, and services. The system is further configured to query a plurality of systems via a network to determine and monitor accounts, email addresses, sites, and services associated with a particular flagged peer, which may or may not be different from the accounts, email addresses, sites or services associated with the subject, and to report communications generated by the flagged peer.

Monitored interactions are stored for later retrieval, analysis or summary, for example via the collection server 304. A counter of a number of interactions the monitored subject has had with a flagged peer is provided, which counter can be weighted based on the type of interaction and predetermined weighting criteria, preferably established via a weighting table. For example, detected phone calls can be weighted higher than detected social network application comment postings, and communications including trigger phrases or terms such as "sex" and "drugs", or corresponding to sufficient classifier scores can be weighted higher than communications not including trigger phrases or communications including less severe trigger phrases, or not corresponding to sufficient classifier scores. A system administrator or the monitoring user can adjust the weightings, or the weightings can be adjusted by a monitoring user based on preferences. The system reports monitored interactions via the monitoring user's stored contact information for their account. The system can send an alert to the monitoring user each time an interaction between a flagged peer and the monitored subject is observed. Alternatively, several observed interactions can be batched together to be transmitted as one package to the monitoring user. Alternatively, summaries of the observed interactions can be provided to the monitoring user. Reports including batched interactions or summaries of the interactions, can be sent on a regular basis (e.g. weekly) or only when the counter indicates a predetermined threshold number of interactions or the combined weightings of the interactions exceeds a predetermined threshold, for example after a significant number of interactions. In reporting batched interactions and summaries, a monitoring user's attention can be drawn toward particular interactions based on weightings of the interactions, for example weightings assigned based on the above described weighting table, by providing indications of communications, or the peers associated therewith, corresponding to weightings exceeding a predetermined threshold.

In addition to pushing alerts responsive to detected interactions, for example to the monitoring user's personal computing device 324 via email, text message or IM, alerts can be pulled by a monitoring user via a website, mobile website, or mobile application enabled by the system, for example enabled via the poller server 305, on which the monitoring user is authenticated. Once the monitoring user is authenticated on the website, mobile website, or mobile application, the monitoring user's account information and any alerts corresponding to a monitored subject are retrieved. These alerts, whether sent or viewed on a website, mobile website, or mobile application, can include an indication that an interaction occurred, and/or the nature of the interaction, and/or all or a portion of the content of the interaction itself. If the latter, interaction content can be pulled real-time from the site or service itself, for example the system can fetch a particular post from a social network when the monitoring user is viewing the alert via a website or mobile application, or the system can pull a copy from a temporary or permanent storage, for example enabled by the collection server 304. To provide context, alerts can include identifying information available for the flagged peer such as the flagged peer's name, photograph, age, phone number, usernames and handles, or demographic information.

Any time the online monitoring system provides an indication of content associated with a particular unflagged peer to the monitoring user, for example "your child just used the phrase 'marijuana' when communicating with his friend Joey" or "The following text was classified as sexual", or "this month, your child's most frequently communicated friend was Joey", the system can provide a link, such as in the form of a button, to let the monitoring user flag that peer as one to watch, for example with one click of a user interface device.

A subject such as a child endeavoring to avoid parental oversight may in an act of deception provide a decoy account to a monitoring user, while retaining an alternate account where the subject transacts actual communication with peers. A decoy account is typically characterized by low overall activity, with few friend associations, and relatively sanitized content. The system is configured to compare the amount of overall activity of an account or email address to a predetermined activity level, for example a threshold. The threshold can be determined based on median account activity of a particular group of account users. The system is configured to alert the monitoring user that an account under consideration may be a decoy account if the level of activity, number of friend associations, or content metrics meets such predetermined threshold.

If the monitoring user tires of increased notifications and scrutiny corresponding to the flagged peer, the system enables the monitoring user to un-flag (i.e. un-designate) such peer to terminate procedures associated with flagged peers. The system, for example via the poller server 305, can automatically prompt the monitoring user, for example via a monitoring user client 312, after a period of time (e.g. weekly, monthly, every two months) or with each notification to make sure that the monitoring user wants to maintain a particular peer as a flagged peer, i.e. continue monitoring the particular peer or continue associating the peer with the afore-described lower reporting thresholds. This prompt can for example be in the form of a communication which enables an easy one-click method to un-flag the peer via a clickable network link, rendering the un-flagged peer unmonitored or subject to the afore-described lower reporting thresholds. Once the peer is un-flagged, the monitored communications corresponding to the peer can be reported to a monitoring user responsive to detecting the triggering criterion or criteria corresponding to un-flagged peers, which reporting threshold is preferably higher than that of flagged peers.

The system, for example via the poller server 305, is enabled to monitor a plurality of types of interactions between a monitored subject and a flagged or un-flagged peer including:

messages and direct communication such as online chat sessions, video chat sessions, emails, direct messages on social networks, text messages and phone calls;

changes in access permission status (e.g. becoming friends or de-friending) or changes in relationship status (e.g. becoming in a relationship or falling out of a relationship) between the monitored subject and the peer on a social network;

the peer tagging the monitored subject in a post, photo, or at a location on a social network or blogging site;

the monitored subject tagging the peer in a post, photo, or at a location on a social network or blogging site;

the peer mentioning the monitored subject in a post or caption on a social network or blogging site;

the monitored subject mentioning the peer in a post or caption on a social network or blogging site;

the peer commenting on, indicating approval of (e.g. "liking" or "+1'ing"), or otherwise upvoting a post or photo generated by the monitored subject on a social network or blogging site;

the monitored subject commenting on, indicating approval of (e.g. "liking" or "+1'ing"), or otherwise upvoting a post or photo generated by the peer on a social network or blogging site;

the peer and the monitored subject being tagged in the same post, photo, or at the same location on a social network or blogging site;

the peer and the monitored subject joining the same online or social network group;

the peer and the monitored subject indicating approval of, commenting on, or otherwise up-voting the same post or photo on a social network or blogging site;

the monitored subject being located at or near a known location of the peer, for example based on the location of the monitored subject's and peers mobile devices as determined with mobile device client software and/or locating devices via network-based infrastructure, and/ or as determined by a social networking application enabled location or location sharing service;

the monitored subject checking in at or near a location the peer has checked in at using a social networking application;

the monitored subject being located at or near, or checking in at or near, a home address associated with the peer, as determined for example from information available on a social networking site, information entered in the monitored subject's phonebook on their mobile device, information entered in the monitored subject's address book in an email account or other account, or manually entered by the monitoring user on the system; and other indications of interactions between the monitored subject and the flagged peer.

Preferably for flagged peers, relatively more or all of the above-described interactions are monitored, and for un-flagged peers relatively less or none of the above-described interactions are monitored.

The system, for example via the poller server 305, is configured to provide an optional interface application such as a browser extension/plug-in, for example operable with the monitoring user client 312, to permit flagging a peer corresponding to the monitored subject. The interface application is preferably configured to enable use of a client application such as an internet browser to add a peer flagging (e.g. "flag this peer") link, button or other tool to a social network profile page or other online interface page such as a Facebook™ profile page. This enables the monitoring user to browse the tool-enabled social network normally, using the monitored subject's login credentials or the monitoring user's own credentials, and to flag peers they consider suspicious or interesting without exiting the social network site or otherwise having to navigate and login to a system-provided site for managing flagged peers.

The system, for example via the poller server 305, is configured to periodically provide a report to the monitoring user including indications of particular peers associated with the monitored subject enabling selective flagging of the peers by the monitoring user. The report can be provided via email or other suitable electronic communication and can optionally include a link to a destination on a network system where the report is stored. The report can be provided responsive to a triggering criterion related to interactions monitored between particular peers and the monitored subject, for example triggering criterion described above. Further responsive to a triggering criterion, reported peers can include a monitored subject's most commonly interacted with peers, a subject's newly acquainted with peers, peers detected as being of a significantly different age than that of the subject, peers with few or no friends in common with the subject, peers associated with content that scores highly in one or more subject matter categories (e.g. including references to sex or drugs or associated terms and phrases or classifier scores), and peers whose rate of interactions with the monitored subject is detected as undergoing rapid change (e.g. an older peer who is suddenly communicating with a child subject much more than normal).

Reports can also be provided to the monitoring user with filtered and/or sorted subsets of peers based on filtering and sorting rules which are user or system generated. Alternatively, periodic reports can be transmitted including a list of all of the monitored subject's peers as detected by the system, for example all of a monitored subject's contacts on a particular social networking site, email account, IM account, and mobile device contact listing. The list can include currently un-flagged peers or both flagged and un-flagged peers with an indication of whether each listed peers is flagged or un-flagged.

When the reports including an indication of one or more peers are provided to the monitoring user, a link, button or other tool is preferably embedded into the report to allow flagging the un-flagged peers within the report, for example with one click. The report further provides the monitoring user with an optional "flag all" which flags all of the listed peers in one action. The link, button or other tool provides a Uniform Resource Locator ("URL") or other network locator data for access to the system's flagging functionality, for example on the poller server 305. The URL or other network locator data includes parameters which encode the relevant account information and the identity of the peer or peers the monitoring user elected to flag.

The system, for example via the poller server 305, is further configured to receive digital photos or indications of photos (e.g. links to photos on a website) containing one or more faces of peers the monitoring user elects to flag to effect designation of the peers. The system is configured to compare the photos with images of the monitored subject's peers available via social networking sites, for example via social networking application servers 309, and with images stored in address books or contacts listings on the monitored subject's mobile device, email or other account systems, sites, services, or other repository of contact information. Based on the comparison the system determines an identity of a designated peer and monitors communications between the designated peer and the subject based on the determined identity. In such way, a monitoring user does not need to know the name of a peer for which flagging is desired to effect flagging.

The system, for example via the poller server 305, is further configured to analyze associations such as friendship connections, overlapping interests, overlapping locations, and communication patterns to organize a monitored subject's peers into groups. For example, the subject may have a set of school friends, distinct from a set of neighborhood friends, and the school friends can be grouped into a first group, and the neighborhood friends can be grouped into a second group. Through analysis of available peer information on accounts, email addresses, sites, and services, for example on the social networking application servers 309, the system groups the subject's peers. For example, all of a subject's peers on a particular social network which are identified as students of a particular high school, members of a particular fan club, or having some other common association can be associated with a particular group. Peers can belong to one, more than one, or no groups. In providing a listing of peers to a user for flagging, the system provides a listing of any groups associated with the peers and the common associations on which the peers are grouped. The system enables an interface to allow the monitoring user to flag grouped peers, wherein by flagging the particular group, each member of the group is flagged. An additional peer determined as commonly associated with a flagged group after the initial flagging of the group can be added to the group and automatically flagged by the system, and a peer which leaves a flagged group can be automatically un-flagged. Responsive to peers' group designations, communications between the subject and the peers can be monitored on accounts, email addresses, sites, and services and reported to the monitoring user.

The system is further configured to enable a monitoring user to adjust notification settings for any particular flagged peer or for flagged peers as a whole. A monitoring user can adjust how they are notified of a peer's interactions with subject, the reporting protocol, for example via text messages, or alternatively, a batched email at the end of the day. A monitoring user can further select what mode of interactions trigger notification, for example a monitoring user can elect to receive notification if a flagged peer messages the monitored subject directly, or alternatively, responsive to any detectable communication originating from the flagged peer. Communications are reported to a monitoring user responsive to the communications corresponding to the selected mode of interaction.

The system provides a management interface, for example via the poller server 305, where the monitoring user can review all of the currently flagged peers and can unflag any that the monitoring user no longer wants to have flagged. Any notifications about a flagged peer (e.g. an email notification telling a parent that a flagged peer was tagged in one of their child's photos posted on a particular social network) can contain a one-click link or button to unflag the flagged peer and/or to change notification settings. When a peer is first flagged or at predetermined intervals, the system can gather information about that peer from across all of the sources being monitored, and the system can transmit to the monitoring user a report on the peer and the nature and history of the peer's relationship and interactions with the monitored subject.

Figure 6:
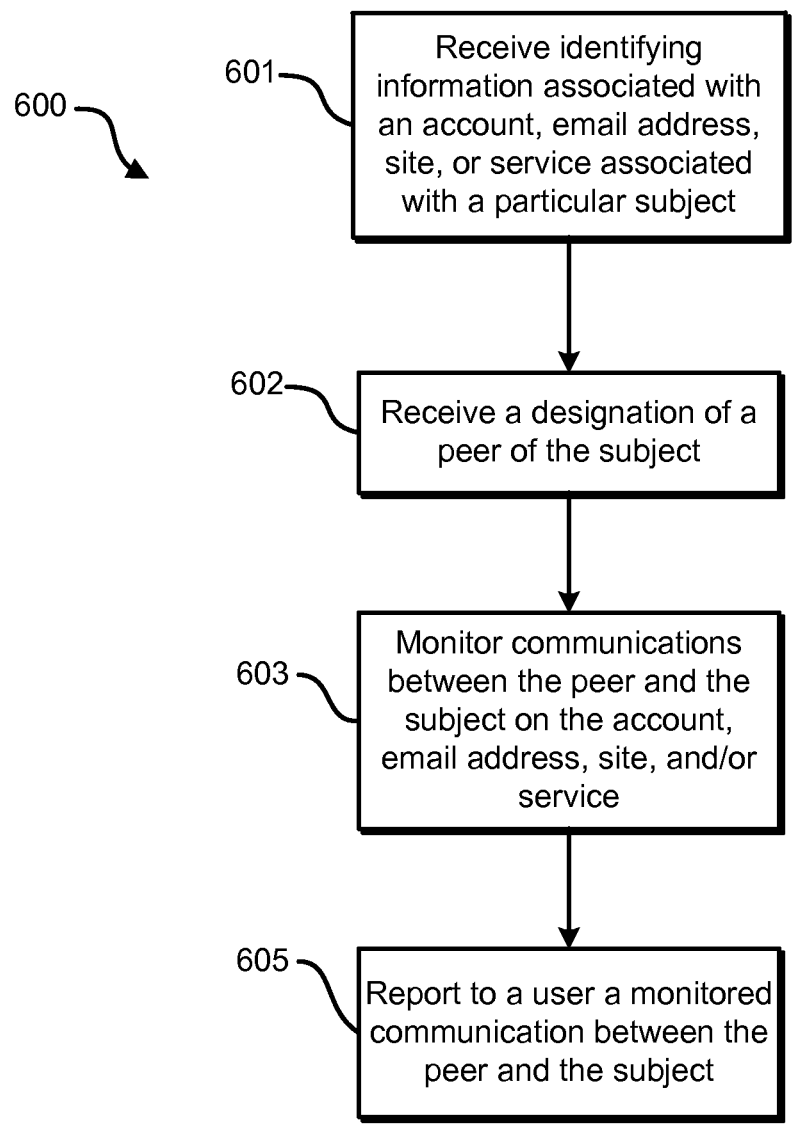
FIGS. 6-8 illustrate monitoring and reporting methods enabling designation of a peer according to embodiments of the within invention.

Referring to FIG. 6, a flow chart is shown illustrating a computer-implemented monitoring and reporting method 600 according to the invention. The method 600 includes receiving via a network identifying information associated with at least one of an account, email address, site, and service on which a particular subject is active (step 601). A designation of a peer of the particular subject is received (step 602). Communications between the peer and the subject on the at least one of the account, email address, site, and service on which the subject is active are monitored responsive to the designation (step 603), and one or more monitored communications between the peer and the subject are reported to a user (step 604).

Figure 7:
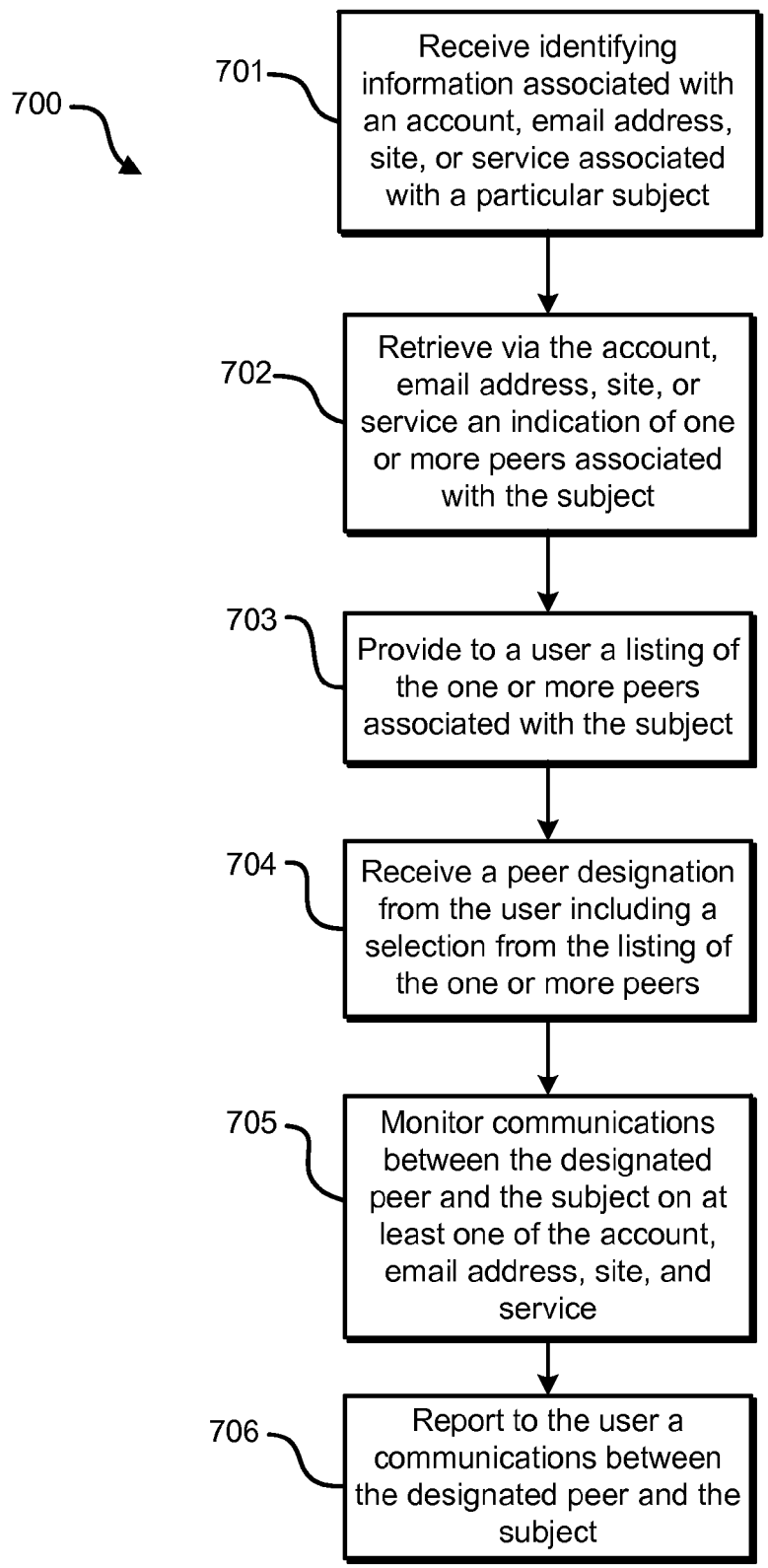

Referring to FIG. 7, a flow chart is shown illustrating a computer-implemented monitoring and reporting method 700 which can function as an extension of the method 600. The method 700 includes receiving identifying information associated with an account, email address, site, or service associated with a particular subject (step 701). An indication of one or more peers associated with the subject are retrieved via the account, email address, site, or service (step 702). A listing of the one or more peers associated with the subject is provided to a user (step 703). A peer designation is received from the user including a selection from the listing of the one or more peers (step 704). Communications are monitored between the designated peer and the subject on at least one of the account, email address, site, and service (step 705). One or more monitored communications between the designated peer and the subject are reported to the user (step 706).

Figure 8:
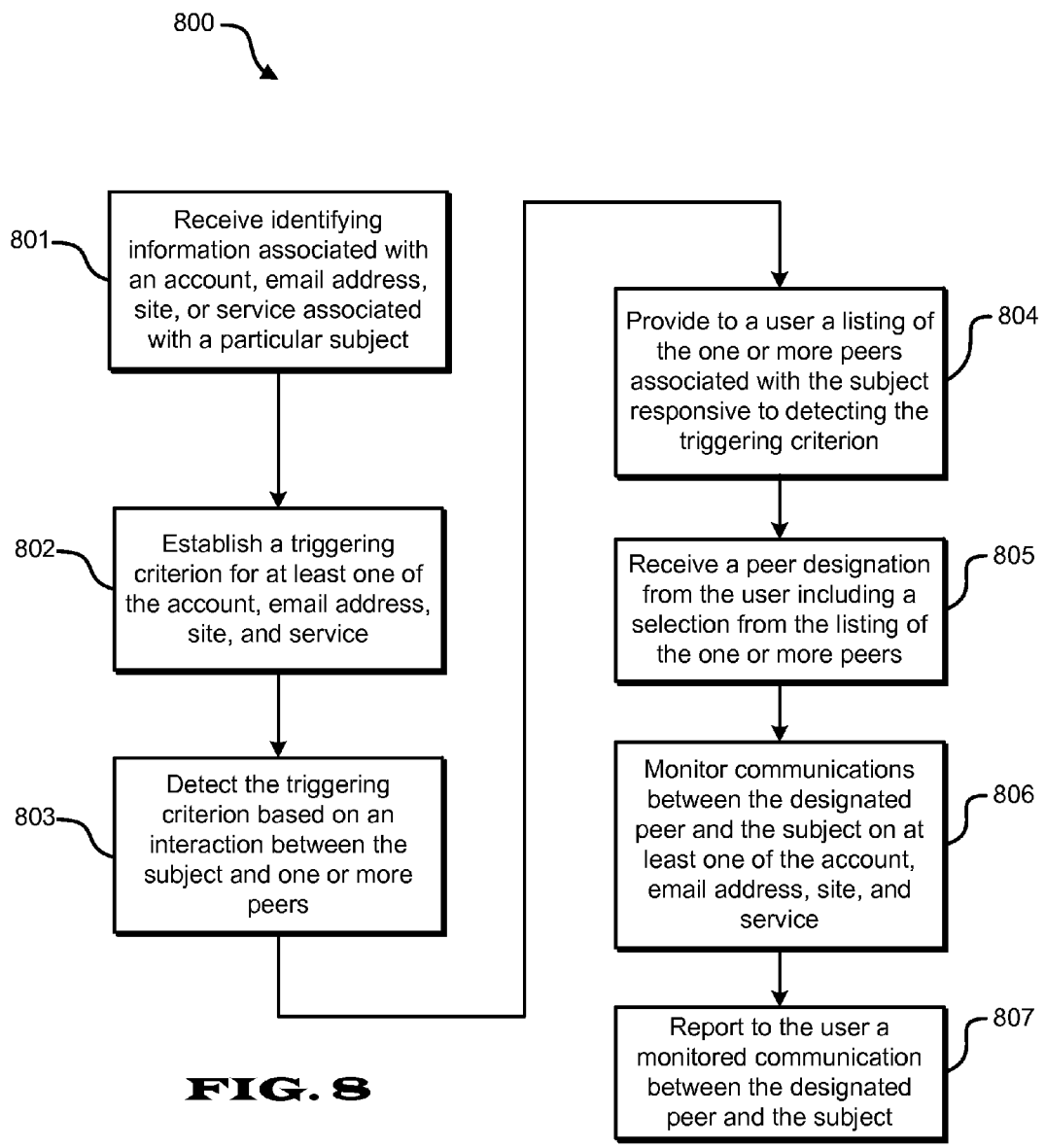

Referring to FIG. 8, a flow chart is shown illustrating another computer-implemented monitoring and reporting method 800 which can function as an extension of the method 600. The method 800 includes receiving identifying information associated with an account, email address, site, or service associated with a particular subject (step 801). triggering criterion is established for at least one of the account, email address, site, and service (step 802). The triggering criterion is detected based on an interaction between the subject and one or more peers on at least one of the account, email address, site, and service (step 803). A user is provided a listing of the one or more peers associated with the subject responsive to detecting the triggering criterion (step 804). A peer designation is received from the user including a selection from the listing of the one or more peers (step 805). Communications are monitored between the designated peer and the subject on at least one of the account, email address, site, and service (step 806). One or more monitored communications between the designated peer and the subject are reported to the user (step 807).

Having described embodiments of the invention, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A computer-implemented monitoring and reporting method comprising:
   receiving via a network identifying information associated with at least one of an account, email address, site, and service associated with a particular subject;
   receiving a designation of a peer of the subject;
   monitoring communications for bullying content between the designated peer and the subject on the at least one of the account, email address, site, and service associated with the subject;
   evaluating by a server on the network, whether or not a relationship exists between the peer and the subject based on at least one of the peer having access permission to the subject's account data and the peer and the subject being friended in a social network;
   determining how many parties mutually have access permission to the account data of the peer and the subject;
   determining how many mutual friends are in common between the peer and the subject;
   determining how frequently parties involved in bullying communicate;
   determining topics of communications having bullying content;
   determining a severity level of the bullying content;
   determining a frequency of communications having bullying content; and
   storing a time activity history of the communications;
   retrieving via the at least one of the account, email address, site, and service an indication of at least one monitored communication having bullying content between the peer and the subject;
   providing to a user a listing of the at least one monitored communication having bullying content between the peer and the subject; and
   storing in the network, the at least one monitored communication and the identifying information of the peer when the user selects the communication from the listing.

2. The computer-implemented monitoring and reporting method of claim 1, further comprising:
   establishing a triggering criterion for the at least one of the account, email address, site, and service associated with the subject;
   detecting the triggering criterion based on at least one interaction between the subject and at least one peer;
   responsive to detecting the triggering criterion providing the user a listing of the at least one peer with an option to designate the at least one peer; and
   receiving the peer designation from the user as a selection from the listing of the at least one peer.

3. The computer-implemented monitoring and reporting method of claim 2, wherein detecting the triggering criterion comprises detecting the at least one peer is the peer most commonly communicating with the subject.

4. The computer-implemented monitoring and reporting method of claim 2, wherein detecting the triggering criterion comprises detecting the at least one peer has communicated with the subject during a predetermined time range.

5. The computer-implemented monitoring and reporting method of claim 2, wherein detecting the triggering criterion comprises detecting that since a prior detection the at least one peer is added as a contact of the subject on the least one of the account, email address, site, and service.

6. The computer-implemented monitoring and reporting method of claim 2, wherein detecting the triggering criterion comprises detecting that the at least one peer is not included as a contact of the subject on the least one of the account, email address, site, and service, but that the subject communicated with the peer on the least one of the account, email address, site, and service.

7. The computer-implemented monitoring and reporting method of claim 2, wherein detecting the triggering criterion comprises detecting the at least one peer differs in age from the subject by a predetermined amount of time.

8. The computer-implemented monitoring and reporting method of claim 2, wherein detecting the triggering criterion comprises detecting that the at least one peer has less than a predetermined number of contacts in common with the subject.

9. The computer-implemented monitoring and reporting method of claim 2, wherein detecting the triggering criterion comprises detecting a change in a number of interactions for a given time period between the at least one peer and the subject.

10. The computer-implemented monitoring and reporting method of claim 2, wherein detecting the triggering criterion comprises detecting a predetermined number of triggering terms or phrases in at least one communication generated by the at least one peer.

11. The computer-implemented monitoring and reporting method of claim 2, further comprising providing the listing of the at least one peer with content of the at least one interaction on which the detected triggering criterion is based.

12. The computer-implemented monitoring and reporting method of claim 2, further comprising:
providing the listing of the at least one communication with content of the at least one interaction on which the detected triggering criterion is based and a link to a network location operable to effect designation of the at least one peer; and
storing in the network the communication and identifying information of the peer when selected by the user.

13. The computer-implemented monitoring and reporting method of claim 1, further comprising:
retrieving via a first account, email address, site, or service an indication of at least one peer associated with the subject;
providing to the user a listing of the at least one peer associated with the subject;
receiving the peer designation from the user as a selection from the listing of the at least one peer; and
monitoring communications for bullying content between the designated peer and the subject on a second account, email address, site, or service associated with the subject.

14. The computer-implemented monitoring and reporting method of claim 1, further comprising:
applying weightings to the at least one monitored communication based on predetermined criteria; and
reporting to the user the at least one monitored communication between the designated peer and the subject responsive to the applied weightings exceeding a predetermined threshold.

15. The computer-implemented monitoring and reporting method of claim 1, further comprising:
applying weightings to the monitored communications based on predetermined criteria; and
reporting to the user the at least one monitored communication with an indication of the applied weightings.

16. The computer-implemented monitoring and reporting method of claim 1, wherein providing to the user the listing of the at least one monitored communication comprises pulling a monitored communication having bullying content in real-time from the at least one of the account, email address, site, and service associated with the subject.

17. The computer-implemented monitoring and reporting method of claim 1, further comprising:
establishing a triggering criterion for the at least one of the account, email address, site, and service associated with the subject;
detecting the triggering criterion based on at least one interaction between the subject and the designated peer; and
reporting to the user the at least one monitored communication having bullying content between the designated peer and the subject responsive to detecting the triggering criterion.

18. The computer-implemented monitoring and reporting method of claim 1, further comprising:
receiving an indication of a triggering criterion from the user;
detecting the triggering criterion based on the at least one monitored communication between the subject and the designated peer; and
reporting to the user the at least one monitored communication having bullying content between the designated peer and the subject responsive to detecting the triggering criterion as indicated by the user.

19. The computer-implemented monitoring and reporting method of claim 1, further comprising:
receiving an indication of a triggering criterion from the user;
detecting the triggering criterion based on the at least one monitored communication of the designated peer; and
reporting to the user the at least one monitored communication having bullying content responsive to detecting the triggering criterion as indicated by the user.

20. The computer-implemented monitoring and reporting method of claim 1, further comprising:
querying a plurality of systems via a network to determine at least one of an account, email address, site, and service associated with the designated peer, different from the at least one of the account, email address, site, and service associated with the subject;
monitoring communications for bullying content generated by the designated peer via the at least one of the account, email address, site, and service associated with the designated peer; and
reporting the communications generated by the designated peer.

21. The computer-implemented monitoring and reporting method of claim 1, wherein the particular subject is associated with a plurality of peers and wherein the designated peer is one of the plurality of peers, the method further comprising:

establishing a first triggering criterion and a second triggering criterion for the at least one of the account, email address, site, and service associated with the subject;
monitoring communications for bullying content between the plurality of peers and the subject on the at least one of the account, email address, site, and service;
detecting the first triggering criterion based on at least one interaction between the subject and the designated peer;
detecting the second triggering criterion based on at least one interaction between the subject and the plurality of peers;
reporting to the user the at least one monitored communication having bullying content between the subject and the designated peer responsive to detecting the first triggering criterion; and
reporting to the user at least one monitored communication having bullying content between the between the subject and the plurality of peers responsive to detecting the second triggering criterion.

22. The computer-implemented monitoring and reporting method of claim 21, wherein the second triggering criterion corresponds to a higher threshold than the first triggering criterion, wherein an interaction meeting the second triggering criterion also meets the first triggering criterion, but an interaction meeting the first triggering criterion does not necessarily meet the second triggering criterion.

23. The computer-implemented monitoring and reporting method of claim 1, further comprising reporting to the user the monitored communications at predetermined time intervals.

24. The computer-implemented monitoring and reporting method of claim 1, wherein receiving the designation of the peer comprises receiving an identifier of the peer from the user, the method further comprising:
providing the identifier to at least one of a site and a service via a network;
retrieving via the at least one of the site and the service at least one additional identifier; and
monitoring the communications for bullying content between the designated peer and the subject on the at least one of the account, email address, site, and service based on the at least one additional identifier.

25. The computer-implemented monitoring and reporting method of claim 24, wherein the identifier comprises at least one of an email address, phone number, social network handle, IM handle, given name and nickname of the designated peer.

26. The computer-implemented monitoring and reporting method of claim 24, further comprising retrieving the at least one additional identifier via an API enabled by the at least one of the site and the service.

27. The computer-implemented monitoring and reporting method of claim 1, wherein receiving the designation of the peer comprises receiving an identifier of the peer from the user, the method further comprising:
retrieving via a network from the at least one of the account, email address, site, and service a listing of at least one peer associated with the subject;
comparing the identifier with the listing of the at least one peer associated with the subject;
determining an identity of the designated peer based on the comparison; and
monitoring the communications for bullying content between the designated peer and the subject on the at least one of the account, email address, site, and service based on the determined identity.

28. The computer-implemented monitoring and reporting method of claim 1, further comprising:
enabling via a network an interface application operable with at least one of the account, the site and the service; and
receiving the peer designation from the user via the interface application during the user's operation of the at least one of the account, the site and the service.

29. The computer-implemented monitoring and reporting method of claim 28, wherein the interface application comprises at least one of a browser extension and a plug-in.

30. The computer-implemented monitoring and reporting method of claim 1, further comprising:
receiving the peer designation from the user as image data corresponding to the designated peer; and
comparing the user-provided image data with image data from at least one of an account, a site, a service, and a device associate with the subject;
determining an identity of the designated peer based on the comparison; and
monitoring the communications between the designated peer and the subject based on the determined identity.

31. The computer-implemented monitoring and reporting method of claim 1, further comprising:
retrieving via the at least one of the account, email address, site, and service an indication of a plurality of peers associated with the subject;
detecting at least one common association among the plurality of peers;
grouping the plurality of peers into a group responsive to detecting the at least one common association;
providing to the user a listing comprising the group; and
receiving the peer designation from the user as a selection from the listing of the group corresponding to the plurality of peers;
monitoring communications between the designated plurality of peers and the subject on the at least one of the account, email address, site, and service associated with the subject responsive to the group designation; and
reporting to the user the monitored communications for bullying content between the designated plurality of peers and the subject.

32. The computer-implemented monitoring and reporting method of claim 31, further comprising:
detecting an additional peer as commonly associated with the designated group after receiving the peer designation from the user;
adding the additional peer to the group;
designating the additional peer responsive to detecting the additional peer as commonly associated with the group;
monitoring communications for bullying content between the designated plurality of peers comprising the additional peer and the subject on the at least one of the account, email address, site, and service associated with the subject responsive to the group designation; and
reporting to the user the monitored communications between the designated plurality of peers comprising the additional peer and the subject.

33. The computer-implemented monitoring and reporting method of claim 1, further comprising:
receiving a notification preference from the user comprising a reporting protocol; and
reporting to the user the at least one monitored communication pursuant to the reporting protocol.

34. The computer-implemented monitoring and reporting method of claim 1, further comprising:

enabling selection by the user of a mode of interaction which triggers the reporting of the at least one communication;

receiving an indication of the selection of the mode of interaction from the user; and reporting the at least one communication to the user responsive to the at least one communication corresponding to the selected mode of interaction.

35. The computer-implemented monitoring and reporting method of claim 1, further comprising:

recording a phone or video conversation between the designated peer and the subject; and providing the recorded conversation to the user.

36. The computer-implemented-monitoring method of claim 1, further comprising:

providing a redirection agent for redirecting network traffic from a personal computing device corresponding to the particular subject;

receiving with a proxy server via the redirection agent an outgoing connection to a targeted application server; and determining if the outgoing connection to the targeted application server website should use HTTP or HTTPS to meet the security requirements of the targeted application server website, and if the URL list indicates a HTTP level of security, accessing with the proxy server the targeted application server website via HTTP, and if the URL list indicates a HTTPS level of security, accessing with the proxy server the targeted application server website via HTTPS.

37. The computer-implemented-monitoring method of claim 1, further comprising:

providing a redirection agent for redirecting network traffic from a personal computing device corresponding to the particular subject;

receiving with a proxy server via the redirection agent an outgoing connection to a targeted application server;

removing an automatic redirect if the targeted application server executes a HTTP redirect process;

accessing the targeted application server website directly such that at least one website page can be intercepted; and rewriting the intercepted at least one website page to retain a connection using HTTP.

38. A computer activity monitoring and reporting system comprising at least one computing system including at least one memory comprising instructions operable to enable the at least one computing system to perform a procedure comprising:

receiving via a network identifying information associated with at least one of an account, email address, site, and service associated with a particular subject;

receiving from a user a designation of a peer of the subject;

monitoring communications for bullying content between the designated peer and the subject on the at least one of the account, email address, site, and service associated with the subject;

evaluating by a server on the network, whether or not a relationship exists between the peer and the subject based on at least one of the peer having access permission to the subject's account data and the peer and the subject being friended in a social network;

determining how many parties mutually have access permission to the account data of the peer and the subject;

determining how many mutual friends are in common between the peer and the subject;

determining how frequently parties involved in bullying communicate;

determining topics of communications having bullying content;

determining a severity level of the bullying content;

determining a frequency of communications having bullying content; and storing a time activity history of the communications;

retrieving via the at least one of the account, email address, site, and service an indication of at least one monitored communication having bullying content between the peer and the subject;

providing to a user a listing of the at least one monitored communication having bullying content between the peer and the subject; and storing in the network, the at least one monitored communication and the identifying information of the peer when the user selects the communication from the listing.

* * * * *